United States Patent
Takeshima (10) Patent No.: US 8,305,654 B2
(45) Date of Patent: Nov. 6, 2012

(54) IMAGE SCANNING APPARATUS AND METHOD OF DETERMINING SIZE OF ORIGINAL DOCUMENT

(75) Inventor: Noriyoshi Takeshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 484 days.

(21) Appl. No.: 12/716,325

(22) Filed: Mar. 3, 2010

(65) Prior Publication Data

US 2010/0232711 A1  Sep. 16, 2010

(30) Foreign Application Priority Data

Mar. 13, 2009  (JP) ................. 2009-061547

(51) Int. Cl.
 *H04N 1/04* (2006.01)
 *H04N 1/40* (2006.01)
 *H04N 1/393* (2006.01)
 *G06F 15/00* (2006.01)
 *G06F 3/12* (2006.01)
 *G06T 5/00* (2006.01)
 *G06K 9/52* (2006.01)
 *G03G 15/00* (2006.01)

(52) U.S. Cl. ........ 358/474; 358/481; 358/449; 358/451; 358/1.7; 358/1.15; 358/3.26; 382/206; 399/16; 399/377; 399/47

(58) Field of Classification Search .......... 358/474, 358/481, 449, 1.7, 1.15, 451, 3.26; 382/206; 399/16, 377, 47

See application file for complete search history.

(56) References Cited

U.S. PATENT DOCUMENTS

| 4,939,553 | A * | 7/1990 | Sato et al. ............... 399/16 |
| 7,471,424 | B2 * | 12/2008 | Ishido et al. ............ 358/449 |
| 7,742,189 | B2 * | 6/2010 | Sobue .................... 358/1.7 |
| 2008/0212125 | A1 * | 9/2008 | Kai ...................... 358/1.15 |
| 2008/0285095 | A1 * | 11/2008 | Iwamoto ................. 358/481 |

FOREIGN PATENT DOCUMENTS

| JP | 2004-349996 A | 12/2004 |
| JP | 2006-005627 A | 1/2006 |
| JP | 2006-313967 A | 11/2006 |
| JP | 2008-166989 A | 7/2008 |

* cited by examiner

*Primary Examiner* — Charlotte M Baker
*Assistant Examiner* — Rury Grisham
(74) *Attorney, Agent, or Firm* — Keating & Bennett, LLP (57) ABSTRACT

An image scanning apparatus arranged to press an original document placed on a glass plate by a platen cover and to scan the original document by a line sensor includes a light source used when scanning image information, a first detection sensor arranged to detect as a first timing a state in which the cover is opened at, for example, an angle of 20 degrees, a second detection sensor arranged to detect as a second timing a state, for example, that is immediately before the cover closes the glass plate, and an original document size determining unit arranged to determine the size of the original document based on the differential data, which is calculated from first image information scanned at the first timing and second image information scanned at the second timing.

16 Claims, 9 Drawing Sheets

IMAGE SCANNING APPARATUS AND METHOD OF DETERMINING SIZE OF ORIGINAL DOCUMENT

CROSS-REFERENCE TO RELATED APPLICATION

This application claims priority under 35 U.S.C. 119 to Japanese Patent Application No. 2009-61547, filed on Mar. 13, 2009, which application is hereby incorporated by reference in its entirety.

BACKGROUND OF THE INVENTION

1. Field of the Invention

The present invention relates to an image scanning apparatus that can automatically determine a size of an original document placed on an original document platen and to a method of determining a size of an original document.

2. Description of the Related Art

In an image scanning apparatus such as a copier and a facsimile machine, when scanning image information of an original document placed on an original document platen, an original document platen cover is closed to press the original document, and then the image information is scanned by a flatbed scanner. The flatbed scanner includes an image scanning sensor such as a Charge Coupled Device (CCD) line sensor or the like, and acquires the image information of the entire original document by moving a scanning portion at a constant speed.

Before scanning the image information of the entire original document, it may be necessary to detect a size of the original document, and various mechanisms are known for automatically detecting the size of the original document. For example, a first conventional image scanning apparatus lights a light source immediately before a platen cover is closed, scans waveform data (image information) with a line sensor, and thus detects a size of an original document in a main scanning direction from the waveform data.

A second conventional image scanning apparatus presses an original document by a press sheet having a diffuse reflectance that is higher than that of a white reference plate, and scans brightness data of the press sheet including the original document in the above-described state.

When detecting the size of the original document from the waveform data, it is preferable to detect the size at the earliest possible timing in a process of closing the platen cover. However, when acquiring the waveform data when an opening/closing angle of the platen cover is relatively great, an edge of the original document may not be detected or may be mistakenly detected due to "disturbing light." Disturbing light is an outside source of light, such as indoor light or sunlight, other than light that is used for determining document size or document scanning, and which may disturb accurate document size determination or document scanning.

As in the first image scanning apparatus, when acquiring the waveform data immediately before the platen cover is closed, a size detection sensor in a sub scanning direction of the original document may respond to a pressing surface of the platen cover, possibly leading to an erroneous detection. Moreover, an edge of the original document is not limited to white but may be various colors such as black and gray. Accordingly, depending on a density of the edge of the original document, the edge of the original document may not be detected or may be mistakenly detected.

In the second image scanning apparatus, the size of the original document is determined by scanning the brightness data of the press sheet including the original document after the platen cover is closed. Accordingly, in the case where all the color or almost all the color of the original document along a scan line is white, the edge of the original document may be mistakenly detected.

SUMMARY OF THE INVENTION

In order to overcome the problems described above, preferred embodiments of the present invention provide an image scanning apparatus and a method of determining a size of an original document that can reliably detect a size of an original document regardless of influences from disturbing light or a density of an edge of the original document.

According to a preferred embodiment of the present invention, an image scanning apparatus includes an original document platen on which an original document is placed; an original document pressing member arranged to press and position the original document placed on the original document platen; an image scanning sensor arranged to scan image information of the original document; a light source arranged to be used when scanning the image information; a detection unit arranged to detect a first timing that is set in a process of closing the original document pressing member and a to detect a second timing that is set in the process of closing the original document pressing member and that is different from the first timing; a control unit arranged to light the light source at least two timings corresponding to the first timing and the second timing, and to control the image scanning sensor to scan the image information; a difference calculating unit arranged to calculate differential data of first image information, which is scanned at the first timing, and second image information, which is scanned at the second timing; and an original document size determining unit arranged to determine a size of the original document based on the differential data.

In the above configuration, the timing of scanning the image information for determining the size of the original document is set at least twice, i.e., at least the first timing and the second timing are set. The detection unit sets the first timing and the second timing. The control unit controls the detection unit and the image scanning sensor so as to scan the first image information at the first timing in the process of closing the original document pressing member and to continuously scan the second image information at the second timing. Then, the differential data of the scanned first image information and second image information is calculated, and the size of the original document is determined based on the differential data.

When the differential data is calculated, the same image information is expected to be scanned in an area where the original document is present regardless of the difference between the first timing and the second timing. Accordingly, when the differential data is calculated, it can be assumed that a calculation result will indicate zero or substantially zero. It can be assumed that such a calculation result is obtained regardless of characters, patterns, or color of the original document.

A difference between a state in which the original document pressing member is located in the vicinity of the image scanning sensor and a state in which the original document pressing member is located away from the image scanning sensor can be detected as a density difference in an area where the original document is absent. Accordingly, it can be assumed that the differential data will indicate a finite value that is greater than zero when calculated. Thus, by using the differential data, an edge can be accurately detected regardless of the influence from the disturbing light or from the density of the edge of the original document, and thus, the size of the original document can be reliably detected.

According to a preferred embodiment of the present invention, the second timing is preferably set immediately before the original document pressing member is closed. By setting the second timing immediately before the original document pressing member is closed, the influence from the disturbing light can be minimized.

According to a preferred embodiment of the present invention, the second timing is preferably set to be a state in which the original document pressing member is closed. By setting the second timing at the closed state, the influence from the disturbing light can be eliminated.

According to a preferred embodiment of the present invention, scan lines of the image information scanned by the image scanning sensor respectively at the first timing and the second timing are preferably set to be the same.

Since the first timing and the second timing preferably share the same scan line, accurate differential data can be acquired. Therefore, the size of the original document can be accurately determined.

According to a preferred embodiment of the present invention, in the differential data, the original document size determining unit preferably recognizes a position where a change in a differential value is detected to be more than or equal to a prescribed level as an edge portion of the original document in a main scanning direction, and then determines the size of the original document.

As described above, when the differential data is calculated, different differential values are detected in an area where the original document is present and in an area where the original document is absent, respectively. In other words, it can be assumed that the differential value changes greatly at a boundary position between the original document present area and the original document absent area. Accordingly, such a position can be recognized as the edge portion of the original document, and the size of the original document can be determined based on such a recognition.

According to a preferred embodiment of the present invention, in the differential data, the original document size determining unit preferably recognizes the area where the differential value is less than or equal to the prescribed level as the original document present area, and then determines the size of the original document.

As described above, when the differential data of the first image information and the second image information is calculated, it can be assumed that the calculation result indicates substantially zero in the original document present area. The portion where such a differential value is less than or equal to the prescribed level can be determined as the original document present area, and the size of the original document can be determined based on such a determination.

According to a preferred embodiment of the present invention, in the differential data, the original document size determining unit preferably determines the size of the original document based on the position where the change in the differential value is detected to be more than or equal to the prescribed level and based on the area where the differential value is detected to be less than or equal to the prescribed level.

The size of the original document can be determined more accurately by conducting determination based on a combination of the detected position and area.

According to a preferred embodiment of the present invention, when there are three or more timings for scanning the image information, the difference calculating unit calculates at least two pieces of differential data among the different timings. When there are two or more positions in common where the change in the differential value is more than or equal to the prescribed level in each of the calculated differential data, the original document size determining unit preferably recognizes such positions as the edge portion of the original document and determines the size of the original document.

For example, when scanning at three timings, first differential data, which is calculated based on the first timing and the second timing, and second differential data, which is calculated based on the first timing and the third timing, are used. When the positions where the change in the differential value is more than or equal to the prescribed level are detected in common from the first differential data and the second differential data, such positions can be recognized as the edge portion of the original document. Thus, the detection accuracy of the original document size can be further increased.

According to a preferred embodiment of the present invention, when there are three or more timings for scanning the image information, the difference calculating unit calculates at least two pieces of differential data among the different timings. When there are two or more areas in common where the differential value is less than or equal to the prescribed level in each of the calculated differential data, the original document size determining unit preferably recognizes such areas as the original document present area and determines the size of the original document.

For example, when scanning at three timings, the first differential data, which is calculated based on the first timing and the second timing, and the second differential data, which is calculated based on the first timing and the third timing, are preferably used. When areas where the differential value is less than or equal to the prescribed level are detected in common from the first differential data and the second differential data, such areas can be determined as the original document present area. Thus, the detection accuracy of the original document size can be further increased.

According to a preferred embodiment of the present invention, the detection unit preferably includes a detection member that is pushed in by an operation of closing the original document pressing member, and preferably detects the timing based on a pressed position of the detection member.

In the above configuration, the plurality of different timings can be reliably detected in the process of closing the original document pressing member.

According to a preferred embodiment of the present invention, the detection member preferably includes at least two detection areas each having a different length in a vertical direction, and the timing is preferably detected based on the difference in the lengths in the vertical direction.

In the above configuration, the plurality of timings can be easily controlled by detecting the difference in the lengths in the vertical direction in the process of closing the original document pressing member.

According to a preferred embodiment of the present invention, the detection unit preferably includes at least two detection sensors arranged to detect different opening/closing angle positions of the original document pressing member.

By providing at least two detection sensors, the different opening/closing angle positions of the original document pressing member can be detected, and the plurality of timings can be easily controlled.

According to a preferred embodiment of the present invention, the detection unit also preferably includes a sensor function of detecting an opened state and a closed state of the original document pressing member.

By providing the detection unit with the sensor function of detecting the opened state and the closed state of the original document pressing member, a special sensor can be omitted, and the existing sensor function can be used, which thereby excels in cost performance.

According to a preferred embodiment of the present invention, the detection unit also is preferably arranged to detect whether or not a book having at least a certain thickness in a vertical direction is placed on the original document platen.

In the above configuration, it is not necessary to provide a special sensor, and the existing sensor function can be used, which thereby excels in cost performance.

According to a preferred embodiment of the present invention, the detection unit is also preferably arranged to detect whether or not the book having a certain thickness in a vertical direction is placed on the original document platen and to detect the opened state and the closed state of the original document pressing member.

In the above configuration, the sensor can perform a plurality of functions, which thereby can excel further in cost performance.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
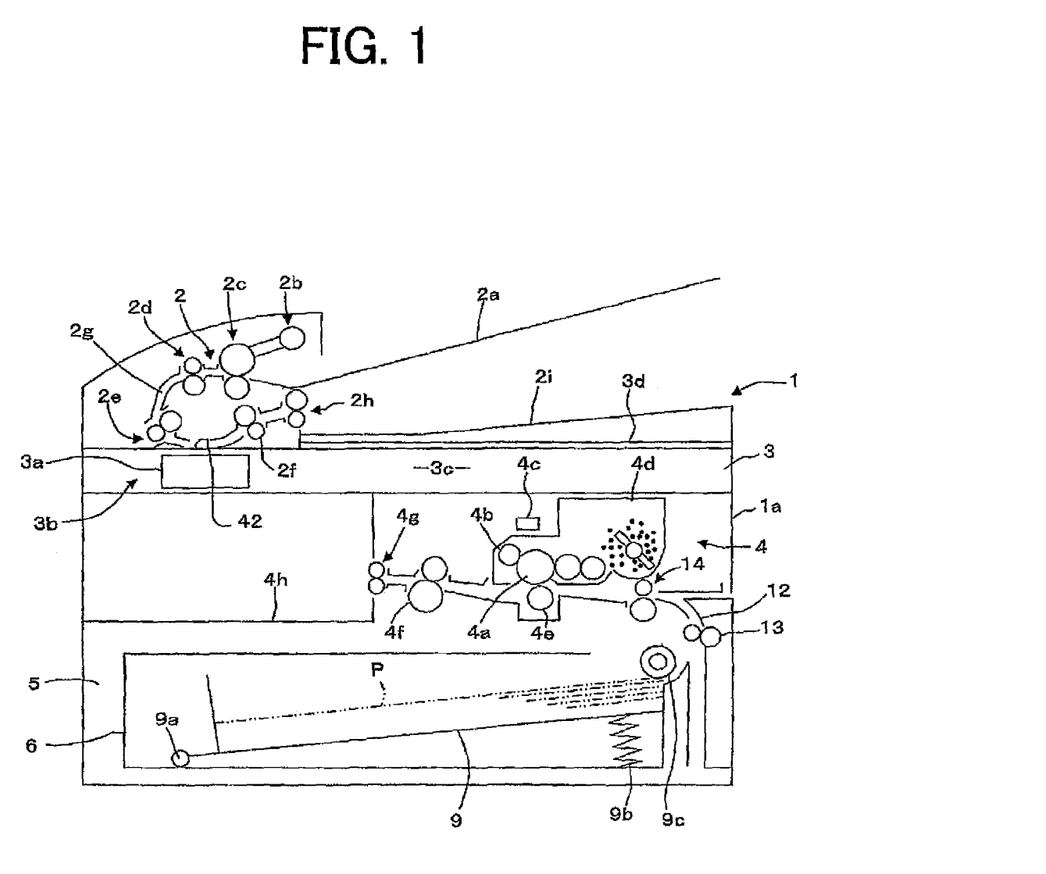
FIG. 1 is a schematic cross-sectional view of an inner structure of an image scanning apparatus according to a preferred embodiment of the present invention.

An image scanning apparatus according to a preferred embodiment of the present invention will be described with reference to the drawings. FIG. 1 is a schematic cross-sectional view of an inner structure of an image forming apparatus including an image scanning apparatus 1 according to a preferred embodiment of the present invention. The image forming apparatus is a copier that includes an Automatic Document Feeder (ADF) 2, an original document scanning unit 3, an image forming unit 4, and a paper feeding unit 5. The ADF 2 and the original document scanning unit 3 together define the image scanning apparatus 1.

The ADF 2 includes an original document tray 2a. A sheet of original document or at least two sheets of original documents in a stacked state may be placed on the original document tray 2a. The ADF 2 feeds the original documents, which are placed on the original document tray 2a, one sheet at a time by a pick-up roller 2b and a separation unit 2c (i.e., a pair of a separation roller and a retarding roller). The original document fed by the ADF 2 is transported through a transportation path 2g by a plurality of transportation rollers 2d, 2e, and 2f, and after having an image thereof scanned in the middle of the transportation path 2g, the original document is sequentially discharged on an original document discharge tray 2i by a discharge roller 2h.

The original document scanning unit 3 (flatbed scanner) includes a scanning portion 3a arranged to scan an image of the original document. When scanning the original document supplied to the original document scanning unit 3 by the ADF 2, while the scanning portion 3a rests in a stationary scanning area 3b, the image of the original document is scanned at a scanning point 42 located in the midway of the transportation path 2g. In the image scanning apparatus 1, by placing the original document on a glass plate 3d (which corresponds to an original document platen) provided above the original document scanning unit 3, the image of the original document can also be scanned while moving the scanning portion 3a in a movable-scanning area 3c. A side having the image of the original document is placed facing upward on the original document tray 2a or facing downward on the glass plate 3d.

The image forming unit 4 includes a photosensitive drum 4a, a charging unit 4b, a light writing unit 4c, a developing unit 4d, a transferring unit 4e, and a fusing unit 4f, and forms an image on a recording paper P through an electrophotographic method. A photoreceptor is formed on a surface of the photosensitive drum 4a, and when forming an image, the surface of the driven and rotated photosensitive drum 4a is uniformly charged by the charging unit 4b. The light writing unit 4c outputs light from a Light-Emitting Diode (LED) or a laser light source based on image information of the original document scanned by the scanning portion 3a. An electrostatic latent image is formed on the surface of the photosensitive drum 4a, which has been uniformly charged by the charging unit 4b, by exposing the surface of the photosensitive drum 4a to the light output from the light writing unit 4c.

When toner supplied from the developing unit 4d adheres to the surface of the photosensitive drum 4a having the electrostatic latent image formed thereon, a toner image is formed on the surface of the photosensitive drum 4a. Then, the toner image is transferred to the recording paper P through the use of the transferring unit 4e. After a heating process and a pressing process are performed by the fusing unit 4f, the recording paper P having the toner image transferred thereon is discharged onto a discharge tray 4h by a discharge roller 4g.

The paper feeding unit 5 includes a recording paper cassette 6 for storing the recording paper P, and the recording paper P in a stacked state can be stored on a supporting plate 9 provided in the recording paper cassette 6. The supporting plate 9 can be rotated around a supporting shaft 9a provided on its end portion, and another end portion on the opposite side of the supporting shaft 9a is biased upward by a compression spring 9b. Thus, the uppermost recording paper P is pressed against a feeding roller 9c. When the feeding roller 9c is driven and rotated in the above-described state, the recording paper P stored in the recording paper cassette 6 is separated and fed to a transportation path 12 one sheet at a time by the feeding roller 9c and a separation pad (not illustrated).

One or a plurality of transportation rollers 13 are provided in the transportation path 12. The recording paper P fed from the recording paper cassette 6 one sheet at a time is transported through the transportation path 12 by the transportation roller(s) 13, and fed to the image forming unit 4. Then, the recording paper P is temporarily stopped immediately before the photosensitive drum 4a by a resist roller 14, and fed at the timing when the toner image formed on the photosensitive drum 4a is transferred.

The original document scanning unit 3, the image forming unit 4, and the paper feeding unit 5 are contained in a housing 1a, and the glass plate 3d is formed on an upper surface of the housing 1a. The ADF 2 is mounted on the upper surface of the housing 1a such that the ADF 2 can be vertically opened and closed. Accordingly, when scanning the original document placed on the glass plate 3d by the scanning portion 3a, the original document can be sandwiched between the ADF 2 and the glass plate 3d by closing the ADF 2.

Figure 2:
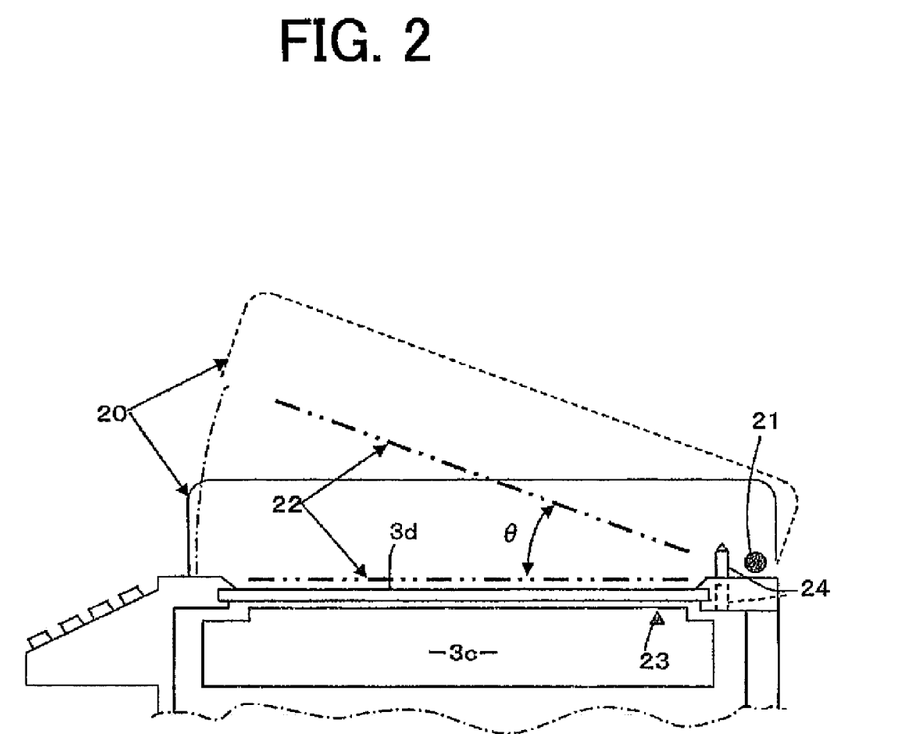
FIG. 2 schematically illustrates a cross-sectional structure in a front-back direction of an image scanning unit.
Figure 4:
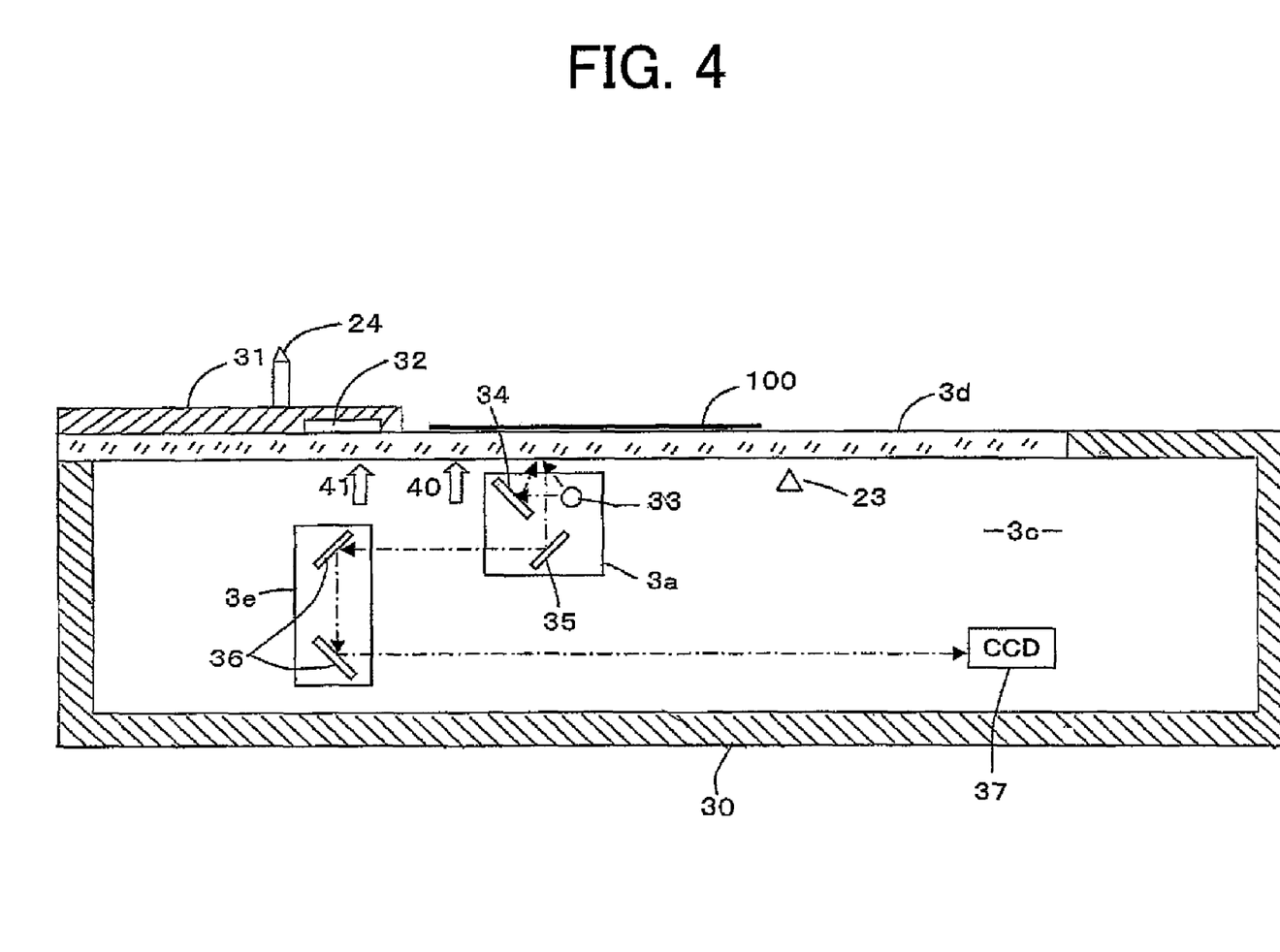
FIG. 4 schematically illustrates a cross-sectional structure in a horizontal direction of the image scanning unit.

Next, the structure of the original document scanning unit will be described. FIG. 2 schematically illustrates a cross-sectional structure in a front-back direction of the image scanning unit 3. FIG. 4 schematically illustrates a cross-sectional structure in a horizontal direction of the image scanning unit 3. FIGS. 5A-5D illustrate specific examples of a structure of a detection unit 27 arranged to detect opening/closing angles of a platen cover 20.

As illustrated in FIG. 2, the platen cover 20 (which corresponds to an original document pressing member) is rotatably supported around a rotation shaft 21 extending in a horizontal direction. A press sheet 22 having a function of pressing the original document is provided on a rear surface of the platen cover 20. The press sheet 22 presses the original document placed on the glass plate 3d from above so as to closely-attach the original document to the glass plate 3d, and also prevents shade from being generated around a surrounding portion of the original document as a background of the original document. A surface of the press sheet 22 that presses the original document is plain white and has a prescribed diffuse reflectance. The ADF 2, etc. is also integrally mounted on the platen cover 20.

A size detection sensor 23 is arranged to detect a size of the original document in a sub scanning direction of the original document. There may be one or more size detection sensors 23. For example, a size of the original document, such as A4 size or A3 size, can be determined based on whether or not the original document is present immediately above the size detection sensor 23. As illustrated in FIG. 4, the size detection sensor 23 is arranged at the center of an exposed portion of the glass plate 3d viewed from the horizontal direction.

Figure 5:
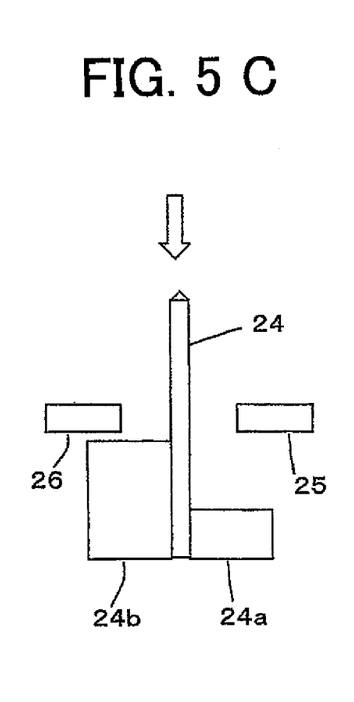
FIGS. 5A-5D illustrate configuration examples of the detection sensor.

As illustrated in FIGS. 5A-5D, the detection unit 27 includes a detection member 24, a first detection sensor 25, and a second detection sensor 26. FIGS. 5A, 5B, and 5C illustrate states of the detection member 24 being pushed by the platen cover 20. FIG. 5D is a plan view of the detection unit 27.

A distal end portion of the detection member 24 outwardly protrudes (refer to FIGS. 2 and 4), and the detection member 24 is biased by a spring (not shown) in a protruding direction. An upper end portion of the detection member 24 is downwardly pushed in by a closing operation of the platen cover 20 against a biasing force.

A first plate 24a (detection area) and a second plate 24b (detection area) are integrally formed with the detection member 24, and the plates 24a and 24b are also vertically moved integrally with the detection member 24. A length of the first plate 24a in a vertical direction is smaller than that of the second plate 24b.

The first detection sensor 25 is provided on a side of the first plate 24a, and a light emitting section 25a and a light receiving section 25b sandwich the first plate 24a. The second detection sensor 26 is provided on a side of the second plate 24b, and a light emitting section 26a and a light receiving section 26b sandwich the second plate 24b.

When the plates 24a, 24b are positioned between the light emitting sections 25a, 26a and the light receiving sections 25b, 26b, respectively, light is blocked out, and when the plates 24a and 24b are lowered, the light reaches the light receiving sections 25b, 26b. Thus, timing can be detected.

The first detection sensor 25 detects whether or not the platen cover 20 is opened at an angle of 20 degrees, for example (which corresponds to a prescribed angle). That is, as the platen cover 20 is gradually closed from a widely-opened state, when an angle θ indicates 20 degrees, the first plate 24a recedes from the first detection sensor 25, and the light can be received (refer to FIG. 5(B)). The timing when the angle θ indicates 20 degrees is defined as a first timing. The angle of the first timing is not limited to 20 degrees, and may be properly set, for example, within a range from 15 degrees to 25 degrees. Alternatively, any range other than the range from 15 degrees to 25 degrees may also be set as the first timing. The first detection sensor 25 also functions as a sensor to detect whether or not a book (such as a thick book) having at least a certain amount of thickness in a vertical direction is present on the glass plate 3d. For example, when a book having at least a certain amount of thickness in the vertical direction is placed, although the first timing can be detected by the first detection sensor 25, a second timing cannot be detected by the second detection sensor 26. Accordingly, when a print button is pressed in this state, the size of the original document is determined based on image information detected at the first timing.

The second detection sensor 26 detects a state that is immediately before the platen cover 20 is closed or a closed state (refer to FIG. 5C). For example, in the state immediately before the closing, the angle θ is less than or equal to 5 degrees, and in the closed state, the angle θ equals 0. The angle of the second timing may be properly set as long as the angle of the second timing is smaller than that of the first timing. The timing when the second detection sensor 26 becomes light-receivable is defined as the second timing. The second detection sensor 26 also functions as an opening/closing sensor to detect whether or not the platen cover 20 is closed.

In the above-described preferred embodiment, the timing is detected preferably when a light-blocked state moves to a light-passing state, however, the timing may be detected when the light-passing state moves to the light-blocked state. In the above-described preferred embodiment, one detection member 24 is preferably provided with the two detection sensors 25 and 26, however, two individually-operating detection members may be provided, and a detection sensor may be provided to each of the detection members to function as an opening/closing angle sensor. Alternatively, a sensor that detects a rotation angle in accordance with a rotation operation of the rotation shaft 21 of the platen cover 20 may be provided.

A photosensor including a combination of a light-emitting element and a light-receiving element may be used as the above-described size detection sensor 23, for example. However, any sensor other than a photosensor may be used as the detection sensors 25 and 26. For example, individually-operating microswitches may be provided to detect the first timing and the second timing, respectively.

Figure 3:
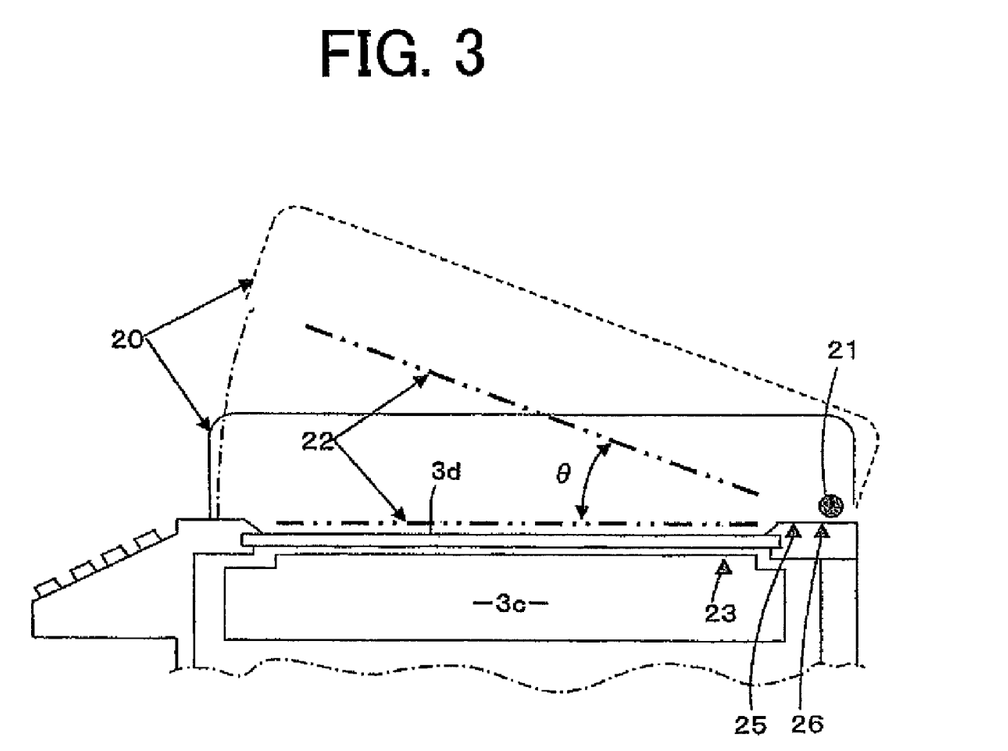
FIG. 3 illustrates an arrangement example of a detection sensor according to another preferred embodiment of the present invention.

FIG. 3 illustrates an arrangement example of the detection sensors according to another preferred embodiment of the present invention. The first detection sensor 25 and the second detection sensor 26 are arranged in the vicinity of a hinge position of the platen cover 20. These detection sensors may be photosensors, for example. The arrangement of the two sensors is not limited to an aligned arrangement in the front/ back direction of the image forming apparatus, but may be an aligned arrangement in the horizontal direction.

A mechanism for scanning image information of the original document will be described with reference to FIG. 4. The glass plate 3d is arranged on an upper portion of a case main body 30 across the horizontal direction, and an original document 100 is placed. The left side of the glass plate 3d is blocked by an insulating plate 31, and a white reference plate 32 is provided on a rear surface of the insulating plate 31. The white reference plate 32 is provided for shading correction.

The scanning portion 3a includes a light source 33 and reflection mirrors 34 and 35, and can be moved at a constant speed along the sub scanning direction (the horizontal direction of the drawing). Irradiation light from the light source 33 is guided directly or via the reflection mirror 34 to a surface of the original document. Reflection light from the surface of the original document is guided to a mirror unit 3e via the reflection mirror 35.

The mirror unit 3e can also be moved at a constant speed along the sub scanning direction, and includes two reflection mirrors 36. Reflection light is guided to a CCD line sensor 37 (which corresponds to an image scanning sensor). The CCD line sensor 37 includes a plurality of sensor arrays along a main scanning direction (the front/back direction of the image forming apparatus). The image scanning sensor is not limited to the CCD, and may be, for example, a Complementary Metal Oxide Semiconductor (CMOS).

When detecting a size in the main scanning direction of the original document 100, a light entering portion with respect to the scanning portion 3a is moved to a position of reference numeral 40, and then the light source 33 is lit. The light source 33 irradiates the surface of the original document with light, and the reflection light thereof is reflected by the reflection mirror 35. Further, the reflection light reaches the CCD line sensor 37 via the two reflection mirrors 36. Thus, (one line of) image information in the main scanning direction of the original document 100 can be scanned. The scanning portion 3a and the mirror unit 3e are driven-controlled such that a light path length between the surface of the original document and the CCD line sensor 37 is maintained constant.

When retrieving shading data, the scanning portion 3a is moved to a position of reference numeral 41, and then image information of the white reference plate 32 is scanned. The shading data is acquired in order to correct unevenness of light amount of the light source 33, variation in optical components, and variation in pixel sensitivity of the CCD line sensor 37. Correction using the shading data is called shading correction.

Next, a function of detecting the size of the original document will be described with reference to the functional block diagram of FIG. 6. A control unit 50 includes a Central Processing Unit (CPU) and a control program, etc. The control unit 50 gives instructions to each unit so that the light source 33 is lit at the first timing and the second timing to scan the image information of the original document by the CCD line sensor 37.

A shading data storage unit 51 includes a memory such as a Random Access Memory (RAM) or the like, and stores as the shading data the image information acquired from the white reference plate 32. The control unit 50 controls the scanning portion 3a to move to a position of reference numeral 41, and thus can acquire the shading data. The timing of scanning the shading data may be properly set such as when power is applied (activated) or immediately before the scanning of the original document is started.

A shading correction unit 52 includes a function of performing shading correction on the image information of the original document through the use of the shading data stored in the shading data storage unit 51. The shading correction is also performed on the image information scanned when detecting the size of the original document.

An image information storage unit 53 stores the image information scanned from the original document. When detecting the size of the original document, one line of the image information along the main scanning direction of the original document is temporarily stored. A first storage area 530 is an area arranged to store first image information, which is scanned at the first timing. A second storage area 531 is an area arranged to store second image information, which is scanned at the second timing. The stored image information is the data on which the shading correction has been performed. A third storage area 532 is an area arranged to store differential data between the first image information and the second image information. A difference calculating unit 54 includes a function of calculating the differential data between the first image information and the second image information.

The same scan line is scanned when scanning the image information at the first timing and the image information at the second timing. Accordingly, the reliability of the differential data can be enhanced, and a later-described detection accuracy of the size of the original document can be increased.

An original document size determining unit 55 determines the size in the main scanning direction of the original document based on the differential data acquired by the difference calculating unit 54. The size of the original document, for example, such as an original document of A4 size or an original document of A3 size, can be determined based on a combination of the detected size and a detection signal transmitted from the size detection sensor 23.

Figure 6:
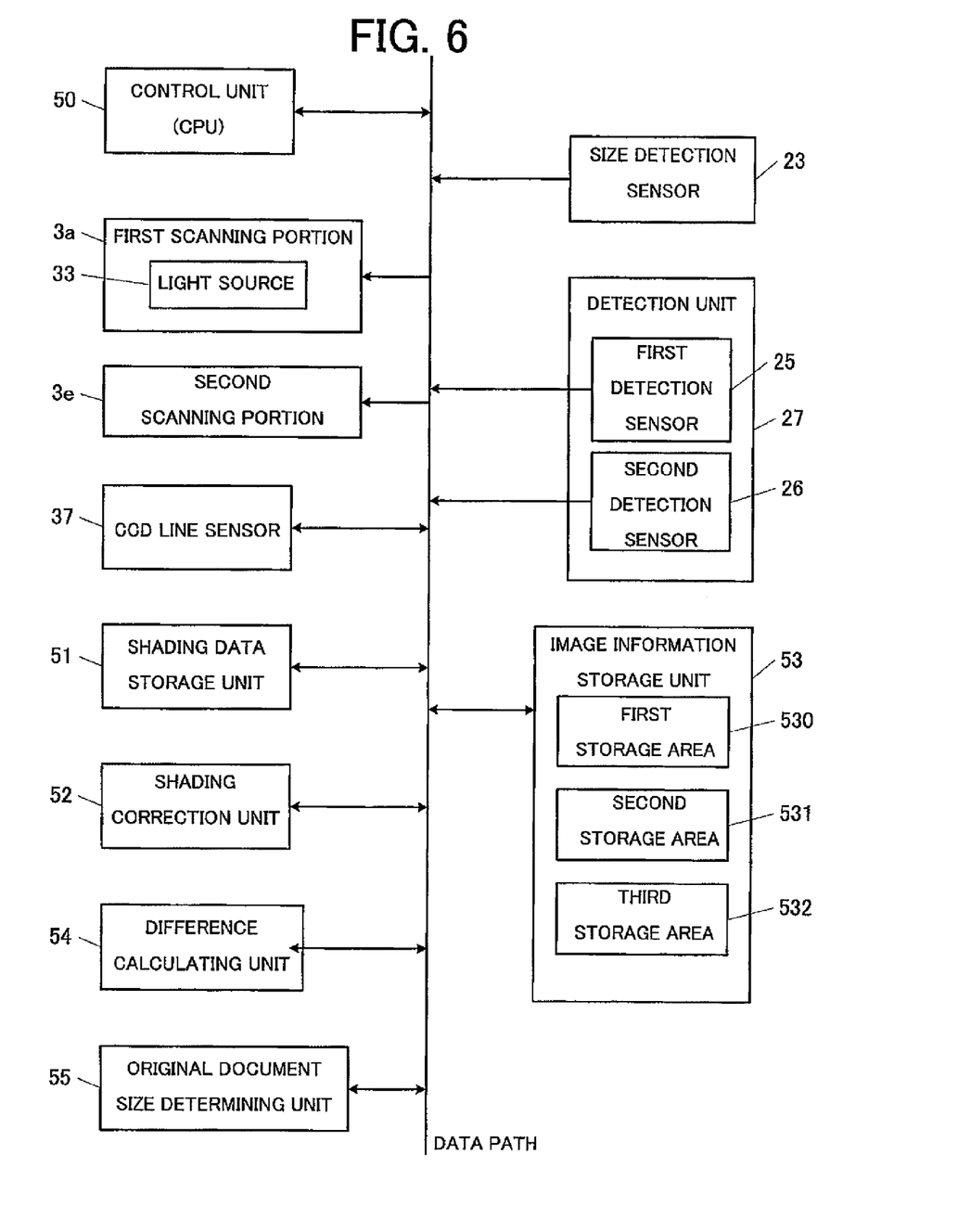
FIG. 6 is a block diagram of a function of detecting a size of an original document.

Functions of the shading correction unit 52, the difference calculating unit 54, and the original document size determining unit 55 illustrated in FIG. 6 may be realized by software or hardware.

Figure 7:
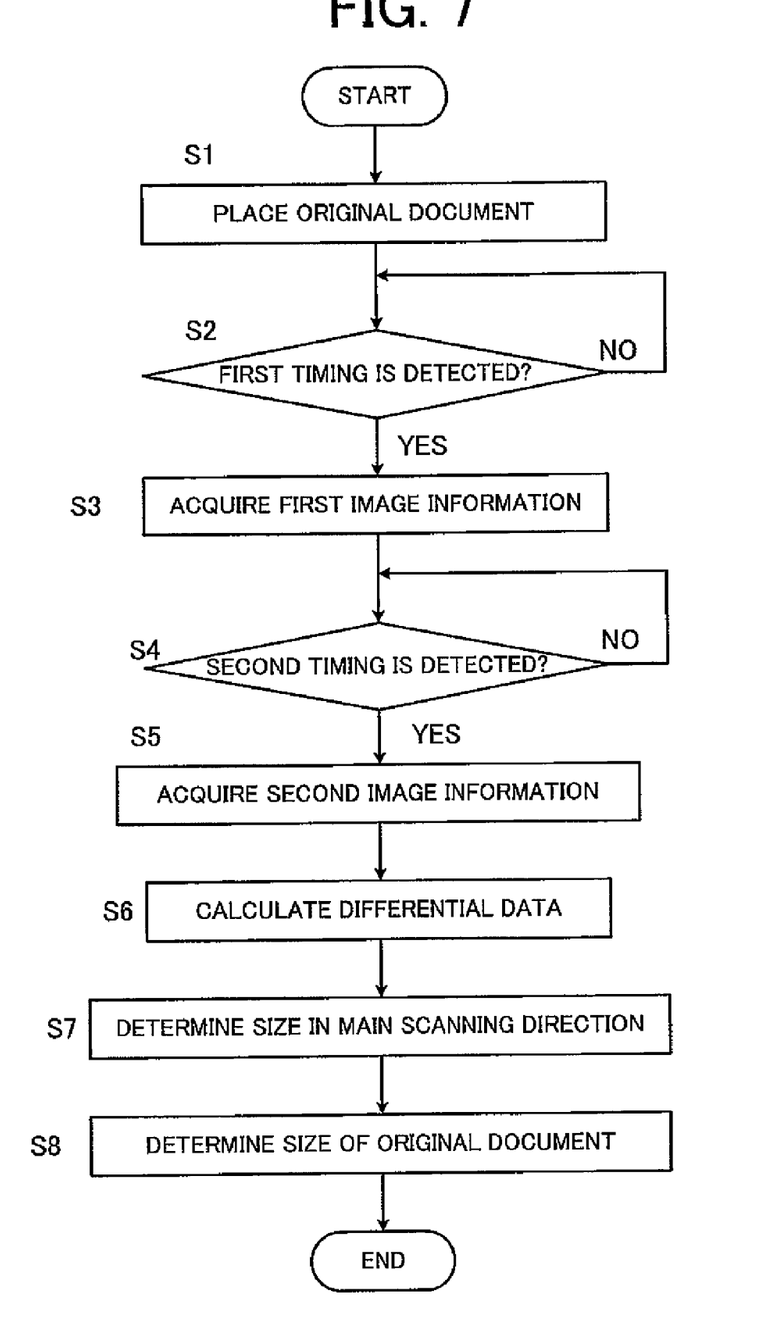
FIG. 7 is a flowchart of a procedure of detecting the size of the original document.
Figure 8:
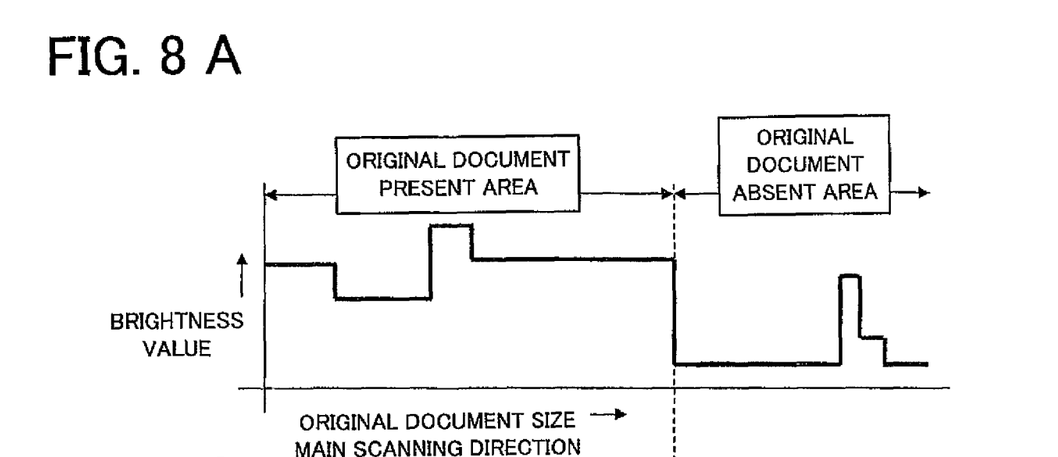
FIGS. 8A-8C illustrates scanned image information.

Next, a procedure of detecting the size of the original document will be described. FIG. 7 is a flowchart describing the procedure of detecting the size of the original document. FIGS. 8A, 8B and 8C illustrate the scanned image information.

First, an original document is placed on the glass plate 3d (S1). At this time, the scanning portion 3a waits at the position of reference numeral 40 of FIG. 4. Next, the platen cover 20 starts being closed. In the middle of the closing operation, the first detection sensor 25 detects (S2) whether or not the opening/closing angle of the platen cover 20 has reached the position of, for example, the angle of 20 degrees, for example (first timing). At the first timing, the light source 33 is lit for a prescribed period of time and the CCD line sensor 37 scans the first image information by an instruction of the control unit 50 (S3). After the shading correction, the scanned image information is stored in the first storage area 530 of the image information storage unit 53. An example of waveform data of the first image information is illustrated in FIG. 8A.

When further closing the platen cover 20, the second detection sensor 26 detects (S4), for example, the state that is immediately before the platen cover 20 is closed or the closed state (second timing). At the second timing, the light source 33 is lit again for a prescribed period of time and the CCD line sensor 37 scans the second image information by an instruction of the control unit 50 (S5). After the shading correction, the scanned image information is stored in the second storage area 531 of the image information storage unit 53. An example of waveform data of the second image information is illustrated in FIG. 8B.

Next, the differential data between the first image information and the second image information is calculated (S6). The acquired differential data is stored in the third storage area 532 of the image information storage unit 53. An example of the differential data is illustrated in FIG. 8C.

The original document size determining unit 55 determines the size in the main scanning direction of the original document based on the differential data (S7). Further, the size of the original document is finally determined based on the size in the main scanning direction and on the detection signal transmitted from the size detection sensor 23 (S8).

Next, a procedure of determining the size of the original document will be described in detail with reference to FIGS. 8A-8C. Referring to the waveform data of the first image information of FIG. 8A, a relatively high brightness value is detected in an area where the original document is present. Most original documents have a white background, and have characters and/or graphics illustrated thereon. Accordingly, an amount of the reflection light is substantial, and a relatively high brightness value is detected. In an area where the original document is absent, since most of the irradiation light of the light source 33 passes through the glass plate 3d, the amount of reflection light is rather small. Accordingly, the brightness value is relatively low. However, an unusual brightness value may be detected partially due to disturbing light at times.

Referring to the waveform data of the second image information of FIG. 8B, similarly to the first image information, a relatively high brightness value is detected in the area where the original document is present. The waveform data of the area where the original document is present hardly changes in both cases of the first image information and the second image information. It is because, since the original document is placed, the same data is acquired regardless of the opening/closing position of the platen cover 20.

In the area where the original document is absent, since the press sheet 22 provided on the rear surface of the platen cover 20 comes nearer, waveform data having a relatively high brightness value can be acquired as compared to the case of the first image information. It is because the reflection light from the white press sheet 22 is detected by the CCD line sensor 37.

FIG. 8C illustrates the differential data, which can be acquired by subtracting the brightness value of the first image information from the brightness value of the second image information. In the area where the original document is present, a difference value equals or substantially equals to zero by the subtraction. Moreover, the waveform hardly has concave-convex portions (ups and downs), and substantially linear waveform data is acquired. In the area where the original document is absent, a finite difference value is acquired, and a concave-convex shape resulted from noise such as the disturbing light can be partially detected.

As described above, the acquisition of the differential data provides rising of the brightness value at an edge portion of the original document, and thus, such a portion can be determined as the edge portion of the original document. Based on positional information of the edge portion, the size of the original document in the main scanning direction can be determined.

As illustrated in FIG. 8C, the differential data indicates zero or substantially zero (i.e., the differential value is less than or equal to a prescribed level) in an area on the left side of the detected edge portion. By detecting the presence (size) of such a left-side area, a determination can be made that the original document is present in the left-side area, and the size in the main scanning direction can also be determined. By determining the size of the original document based on both the detection of the area where the original document is present and the positional information of the edge portion, the size of the original document can be determined more accurately.

Figure 9A:
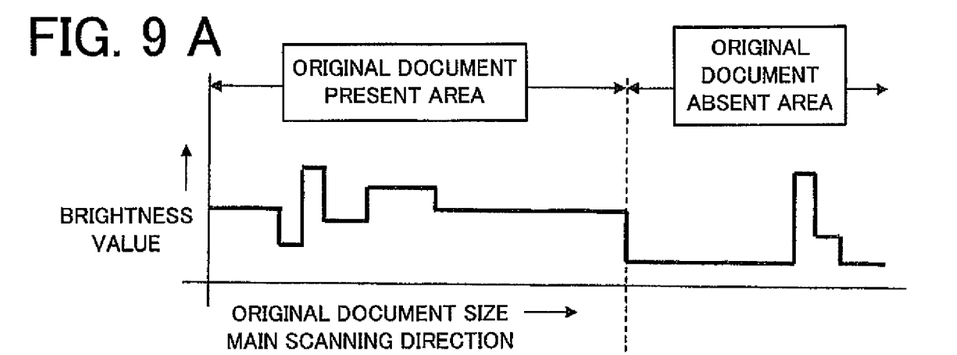
FIGS. 9A-9C illustrate scanned image information according to another preferred embodiment of the present invention.
Figure 9B:
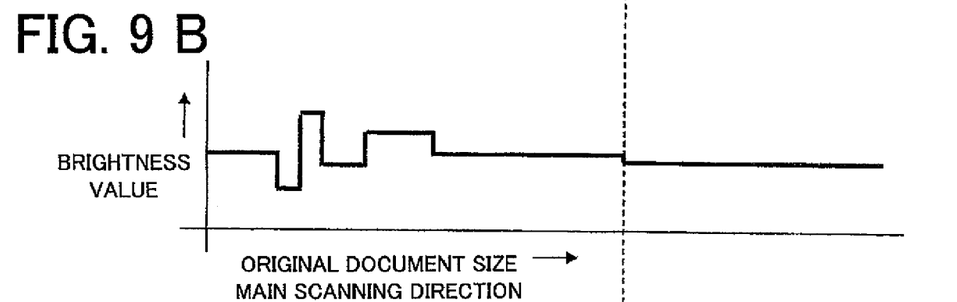
Figure 9C:
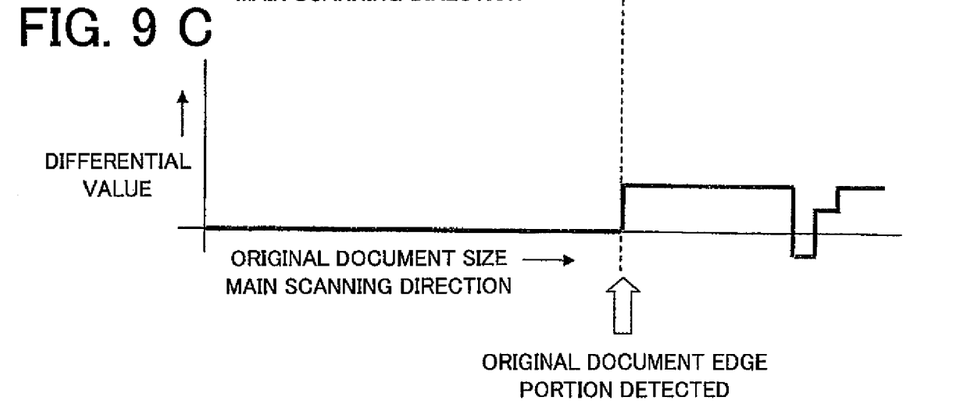

Regardless of the color, density, and pattern (design) of the original document, the differential data always indicates zero or substantially zero in the area where the original document is present. In the example of FIGS. 8A-8C, the brightness value changes greatly at the edge portion of the original document both in the first image information and the second image information, however, depending on the original document, such an apparent change may not be detected. For example, as illustrated in FIGS. 9A-9C, such an apparent change is not detected in the case where the edge of the original document is black or gray. Even in such a case, an apparent change in the brightness value can be detected by acquiring the differential data. As a result, regardless of the color, density, and pattern of the original document, the size of the original document can be reliably determined.

In the above-described preferred embodiments, two detection sensors are preferably provided to detect two timings, however, three or more detection sensors may be provided to detect three or more timings. In such a case, the detection sensor is not limited to a photosensor.

For example, when there are three or more timings at which the image information is scanned, the difference calculating unit 54 calculates at least two pieces of differential data among the different timings. In each of the calculated differential data, when there are two or more positions in common where the change in the differential value is more than or equal to the prescribed level, the original document size determining unit 55 recognizes such positions as the edge portion of the original document and determines the size of the original document.

For example, when scanning the image information at three timings, first differential data, which is calculated based on the first timing and the second timing, and second differential data, which is calculated based on the first timing and the third timing, are preferably used. Alternatively, differential data that is calculated based on the second timing and the third timing may be used. When positions where the change in the differential value is more than or equal to the prescribed level are detected in common from the first differential data and the second differential data, such positions may be recognized as the edge portion of the original document.

When there are three or more timings at which the image information is scanned, the difference calculating unit 54 calculates at least two pieces of differential data among the different timings. In each of the calculated differential data, when there are two or more areas in common where the differential value is less than or equal to the prescribed level, the original document size determining unit 55 recognizes such areas as the original document present area and determines the size of the original document.

For example, when scanning the image information at three timings, first differential data, which is calculated based on the first timing and the second timing, and second differential data, which is calculated based on the first timing and the third timing, are preferably used. Alternatively, differential data that is calculated based on the second timing and the third timing may be used. When areas where the differential value is less than or equal to the prescribed level are detected in common from the first differential data and the second differential data, such areas may be recognized as the original document present area. Thus, a detection accuracy of the original document size can be further increased.

A similar configuration may be applied to a case where the scanning is performed at four or more timings.

While the present invention has been described with respect to preferred embodiments thereof, it will be apparent to those skilled in the art that the disclosed invention may be modified in numerous ways and may assume many preferred embodiments other than those specifically set out and described above. Accordingly, the appended claims are intended to cover all modifications of the present invention that fall within the true spirit and scope of the present invention.

What is claimed is:

1. An image scanning apparatus comprising:
   an original document platen on which an original document can be placed;
   an original document pressing member arranged to press and position the original document placed on the original document platen;
   an image scanning sensor arranged to scan image information of the original document;
   a light source arranged to be used when scanning the image information;
   a detection unit arranged to detect a first timing that is set in a process of closing the original document pressing member and to detect a second timing that is set in the process of closing the original document pressing member and that is different from the first timing;
   a control unit arranged to light the light source at least two timings corresponding to the first timing and the second timing when the original document pressing member is being closed, and to scan the image information by the image scanning sensor;
   a difference calculating unit arranged to calculate differential data between first image information scanned at the first timing and second image information scanned at the second timing; and
   an original document size determining unit arranged to determine a size of the original document based on the differential data.

2. The image scanning apparatus according to claim 1, wherein the second timing is immediately before the original document pressing member is closed.

3. The image scanning apparatus according to claim 1, wherein the second timing is a time when the original document pressing member is closed.

4. The image scanning apparatus according to claim 1, wherein scan lines of the image information scanned by the image scanning sensor at the first timing and the second timing, respectively, are set to be the same.

5. The image scanning apparatus according to claim 1, wherein the original document size determining unit is arranged to recognize in the differential data a position where a change in a differential value is greater than or equal to a prescribed level as an edge portion of the original document in a main scanning direction, and then to determine the size of the original document.

6. The image scanning apparatus according to claim 1, wherein the original document size determining unit is arranged to recognize in the differential data an area where a differential value is less than or equal to the prescribed level as an original document present area, and then to determine the size of the original document.

7. The image scanning apparatus according to claim 1, wherein the original document size determining unit is arranged to determine in the differential data the size of the original document based on the position where a change in the differential value is detected to be more than or equal to the prescribed level and on the area where the differential value is detected to be less than or equal to the prescribed level.

8. The image scanning apparatus according to claim 5, wherein when the image information is scanned at three or more timings, the difference calculating unit calculates at least two pieces of differential data among the different timings, and
   when two or more positions where the change in the differential value is greater than or equal to the prescribed level are determined to be in common in each of the calculated differential data, the original document size determining unit recognizes such positions as an end portion of the original document, and then determines the size of the original document.

9. The image scanning apparatus according to claim 6, wherein when the image information is scanned at three or more timings, the difference calculating unit calculates at least two pieces of differential data among the different timings, and
   when two or more areas where the differential value is less than or equal to the prescribed level are determined to be in common in each of the calculated differential data, the original document size determining unit recognizes such areas as an original document present area, and then determines the size of the original document.

10. The image scanning apparatus according to claim 1, wherein the detection unit includes a detection member arranged to be pushed in by an operation of closing the original document pressing member, and the timing is detected based on a position where the detection member is pushed in.

11. The image scanning apparatus according to claim 10, wherein the detection member includes at least two detection areas each having a different length in a vertical direction, and the timing is detected based on the difference in the lengths in the vertical direction.

12. The image scanning apparatus according to claim 1, wherein the detection unit includes at least two detection sensors arranged to detect different opening and closing angle positions of the original document pressing member.

13. The image scanning apparatus according to claim 1, wherein the detection unit is arranged to detect an opened state and a closed state of the original document pressing member.

14. The image scanning apparatus according to claim 1, wherein the detection unit is arranged to detect whether or not a book having a certain amount of thickness in a vertical direction is placed on the original document platen.

15. The image scanning apparatus according to claim 1, wherein the detection unit is arranged to detect whether or not a book having a certain amount of thickness in a vertical direction is placed on the original document platen and to detect the opened state and the closed state of the original document pressing member.

16. A method of determining a size of an original document comprising the steps of:
   lighting a light source at least two timings corresponding to a first timing and a second timing, when closing an original document pressing member;
   scanning image information of an original document by an image scanning sensor;
   calculating differential data between first image information scanned at the first timing and second image information scanned at the second timing; and
   determining a size of the original document based on the differential data.

* * * * *